(12) United States Patent
Giorgella

(10) Patent No.: US 11,596,259 B2
(45) Date of Patent: Mar. 7, 2023

(54) COFFEE TAMPER

(71) Applicant: Slingshot Technology Corporation Limited, Kowloon (HK)

(72) Inventor: Luca Giorgella, Kowloon (HK)

(73) Assignee: SLINGSHOT TECHNOLOGY CORPORATION LIMITED, Kowloon (HK)

( * ) Notice: Subject to any disclaimer, the term of this patent is extended or adjusted under 35 U.S.C. 154(b) by 382 days.

(21) Appl. No.: 16/875,315

(22) Filed: May 15, 2020

(65) Prior Publication Data

US 2020/0359827 A1 Nov. 19, 2020

(30) Foreign Application Priority Data

May 17, 2019 (HK) .................. 19123955.7

(51) Int. Cl.
    *A47J 31/06*     (2006.01)
    *A47J 31/52*     (2006.01)

(52) U.S. Cl.
    CPC ....... *A47J 31/0663* (2013.01); *A47J 31/5251* (2018.08)

(58) Field of Classification Search
    CPC ........ A47J 31/06; A47J 31/0663; A47J 31/44; A47J 31/4403; A47J 31/5251
    USPC .......................................... 99/280
    See application file for complete search history.

(56) References Cited

U.S. PATENT DOCUMENTS

2015/0257579 A1* 9/2015 Dammermann .... A47J 31/3633
    426/454

FOREIGN PATENT DOCUMENTS

| CN | 206525945 U | 9/2017 |
| CN | 107319942 A | 11/2017 |
| CN | 108652448 A | 10/2018 |
| KR | 101457189 B1 | 10/2014 |

\* cited by examiner

*Primary Examiner* — Toan C Ly
(74) *Attorney, Agent, or Firm* — Muncy, Geissler, Olds & Lowe, P.C.

(57) ABSTRACT

The present invention provides a coffee tamper, comprising a casing. A driving device is arranged on the inner top of the casing, connected to a tamping device and used to drive the tamping device to press down and move up. The tamping device is used to press down a container filled with coffee powder and comprises a main shaft, the driving device is connected to the upper end of the main shaft, and a tamping head is connected to the lower end of the main shaft and can be pressed into the container; and in one of embodiments, a container pressing head is sleeved on outside of the tamping head and has an outer cover sleeved on outside of the tamping head, the lower edge of the outer cover is located on the same horizontal plane and presses against the upper edge of the container, and the tamping head can move up and down relative to the container pressing head. The present invention provides a novel coffee tamper, which can overcome defects of existing equipment, apply uniform pressure on coffee powder and make flat coffee powder.

12 Claims, 13 Drawing Sheets

COFFEE TAMPER

TECHNICAL FIELD

The present invention relates to an automatic coffee tamper.

BACKGROUND ART

Tamping is a step of coffee making. The ground coffee powder needs to be tamped before brewing. Tamping has a considerable influence on the taste of brewed coffee. Nowadays, tamping generally relies on a manual method and a mechanical automatic method.

The existing tamping methods have the following main defects.

Manual tamping may cause hand fatigue and even injury, and the efficiency is not high. Some manual tampers on the market apply rack driving. Although it can reduce fatigue, it still can not substantively solve the problem, and it does not have a rotating action, resulting in an imperfect tamping effect.

There are also some mechanized automatic tampers on the market, but the tamping force of a motor is output by calculating the amount of current. This method will have errors due to power transmission by parts. For example, the container (portafilter) is not horizontal, affecting the actual pressure of coffee powder and eventually causing an imperfect tamping effect.

Further, in order to ensure that the tamped coffee powder is evenly stressed, the coffee powder is generally tamped several times, and for some tampers capable of performing tamping several times (with or without a rotating action), the coffee powder tamped several times may be beyond the required pressure value.

After the foregoing equipment fills the coffee powder into a container (portafilter), the coffee powder generally will present in a shape of a small hill. Before tamping, the barista needs to flatten the hill by hand or tool so that the coffee powder is evenly pressed. Existing equipment is unable to achieve mechanization and automation of this step.

In summary, existing coffee tamping methods, whether manual or automatic, still have a room for improvement.

SUMMARY OF THE INVENTION

The main technical problem solved by the present invention is to provide a novel coffee tamper, which can overcome the defects of existing equipment, apply uniform pressure on coffee powder and make flat coffee powder.

The technical means employed by the present invention is as follows. A coffee tamper, comprising a casing, is provided; a driving device is arranged on the inner top of the casing, connected to a tamping device and used to drive the tamping device to press down and move up; the tamping device is used to press down a container filled with coffee powder and comprises a main shaft; and the driving device is connected to the upper end of the main shaft, and a tamping head is connected to the lower end of the main shaft and can be pressed into the container.

The driving device comprises an obliquely arranged tilting disc, of which center is connected to a motor that drives the disc to rotate; the lower surface of the high end of the tilting disc is connected to a transmission component, the bottom of the transmission component is connected to a location near an outer side of the upper surface of a horizontal disc, and the center of the lower surface of the horizontal disc is connected to a main shaft; and the bottom of the transmission component is a fixing seat, an opening is arranged in the middle of the fixing seat, interior of the opening is connected to the lower end of a rotating arm via the connecting shaft, and the upper end of the rotating arm is a spherical joint contained in the tilting disc to form a movable connecting structure.

A container pressing head is sleeved on outside of the tamping head and has an outer cover sleeved on outside of the tamping head, the lower edge of the outer cover is a horizontal structure and presses against the upper edge of the container, and the tamping head can move up and down relative to the container pressing head At least one downward U-shaped opening is arranged on a side wall of the outer cover of the container pressing head to allow passage of a container filled with coffee powder. Alternatively, three downward U-shaped openings can be arranged on a side wall of the outer cover of the container pressing head so that three contact portions on the same horizontal plane are formed on the lower edge of the outer cover.

The coffee tamper of the present invention is further provided with a fixing shaft, the upper end of the fixing shaft is fixed with a locating plate arranged at a middle location inside the casing, the fixing shaft is sleeved on a main shaft, the top of an outer cover of the container pressing head is connected to a fixing portion, through which the container pressing head is sleeved on the fixing shaft, a spring is contained in the fixing portion and sleeved on the fixing shaft, one end of the spring is connected to the locating plate and the other end presses against the top of the outer cover of the container pressing head.

A longitudinal fixing plate is arranged inside the casing, the bottom of the longitudinal fixing plate is connected to a locating plate, a plate is horizontally arranged on the top of the longitudinal fixing plate, and a height adjusting knob is arranged at the top of the casing, passes through the top of the casing and is connected to the plate in a threaded manner; and the tilting disc and a motor are arranged on an obliquely arranged moving plate, the lower end of the moving plate is fixed on the longitudinal fixing plate in a rotatable manner, an inclination adjusting slot is vertically arranged on the longitudinal fixing plate, and a relative high end of the moving plate is fixed with the inclination adjusting slot in a movable manner so as to adjust inclination of the moving plate.

A locating slot is arranged in the middle of a side wall of the casing.

A metal detecting component is arranged at the bottom of the casing located below a tamping head.

An electronic scale that can measure pressure is arranged at the bottom of the casing, and when a container is put into the coffee tamper, the container is put on the electronic scale.

The electronic scale is provided with an outward U-shaped opening, which is matched with a container, allows entry of the container and supports the container.

The upper end of the main shaft (7) is connected to an electronic scale (6).

The main shaft (7) is a hollow structure, a weighing shaft (70) is sleeved inside the main shaft (7), a clamping edge (701) is outwardly arranged at the upper end of the weighing shaft (70), an accommodation space is arranged between the upper inner wall of the main shaft (7) and the weighing shaft (70), a step portion (702) is formed below the accommodation space, a shaft spring (703) is arranged inside the accommodation space, the upper end of the shaft spring (703) is against the lower part of the clamping edge (701), and the lower end of the shaft spring (703) is against the step portion (702); the upper end face of the clamping edge (701) presses against the lower surface of the electronic scale (6), and the lower end of the weighing shaft (70) is connected to a tamping head (4).

A protective cover (62) is arranged above the electronic scale (6), and rubber dampers (63) are arranged between the protective cover (62) and the electronic scale (6).

The present invention has the following beneficial effects. The present invention adopts a cooperative structure of a container pressing head and a tamping head. The tamping head can rotate and press down to substitute a step of flattening. The container head keeps the container horizontal and makes stress of coffee powder more uniform. Further, an electronic scale is provided so that the stress of coffee powder can be measured in real time and output pressure can be more accurate. The metal detector can ensure the motor is actuated only after the container is placed at a designated location, avoiding injury of hands. Further, the electronic scale can be arranged in the inner top of the coffee tamper alternatively, and this structure can achieve a better feedback effect during tamping. Through this design, force from coffee powder is directly transferred to the electronic scale via the tamping head and the main shaft, force measurement is more accurate, and contamination is avoided. By use of the structure provided by the present invention, electronic programs can be adjusted according to different requirements to meet requirements of different scenarios.

DETAILED DESCRIPTION

Figure 6:
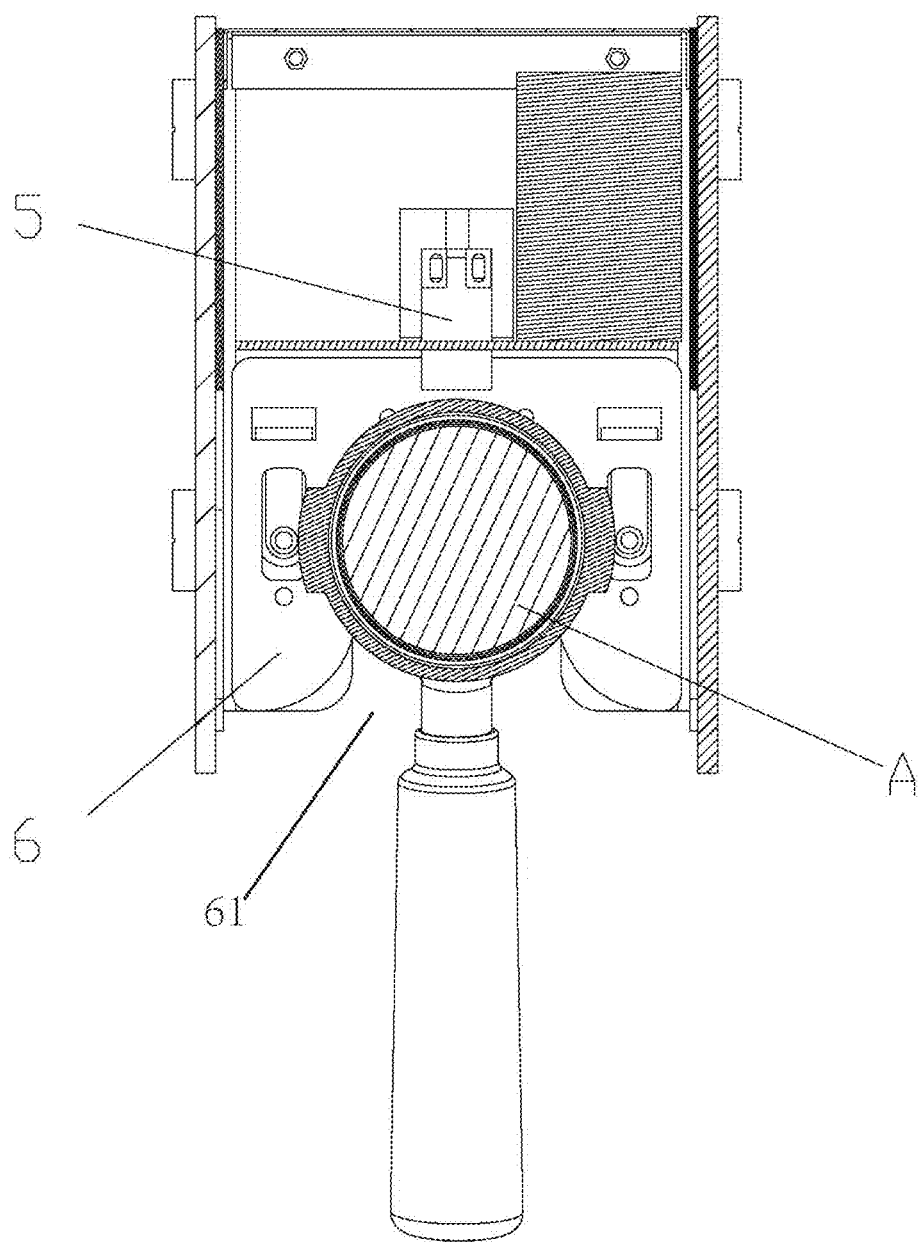
FIG. 6 is a local top perspective structural schematic view after a container is put into the coffee tamper provided by the present invention.
Figure 7:
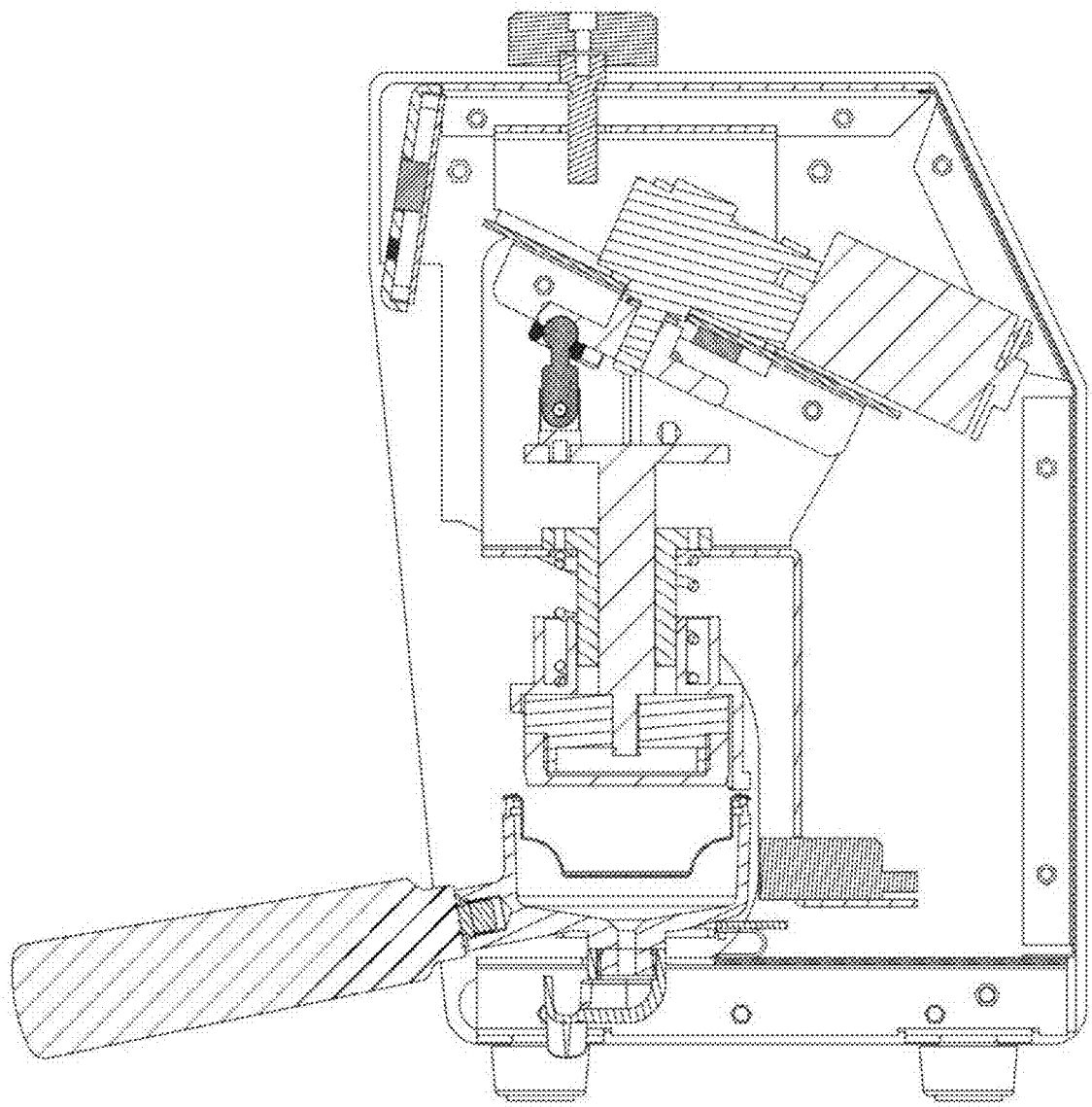
FIG. 7 is a lateral perspective structural schematic view after a container is put into the coffee tamper provided by the present invention and before a tamping head is pressed down.
Figure 8:
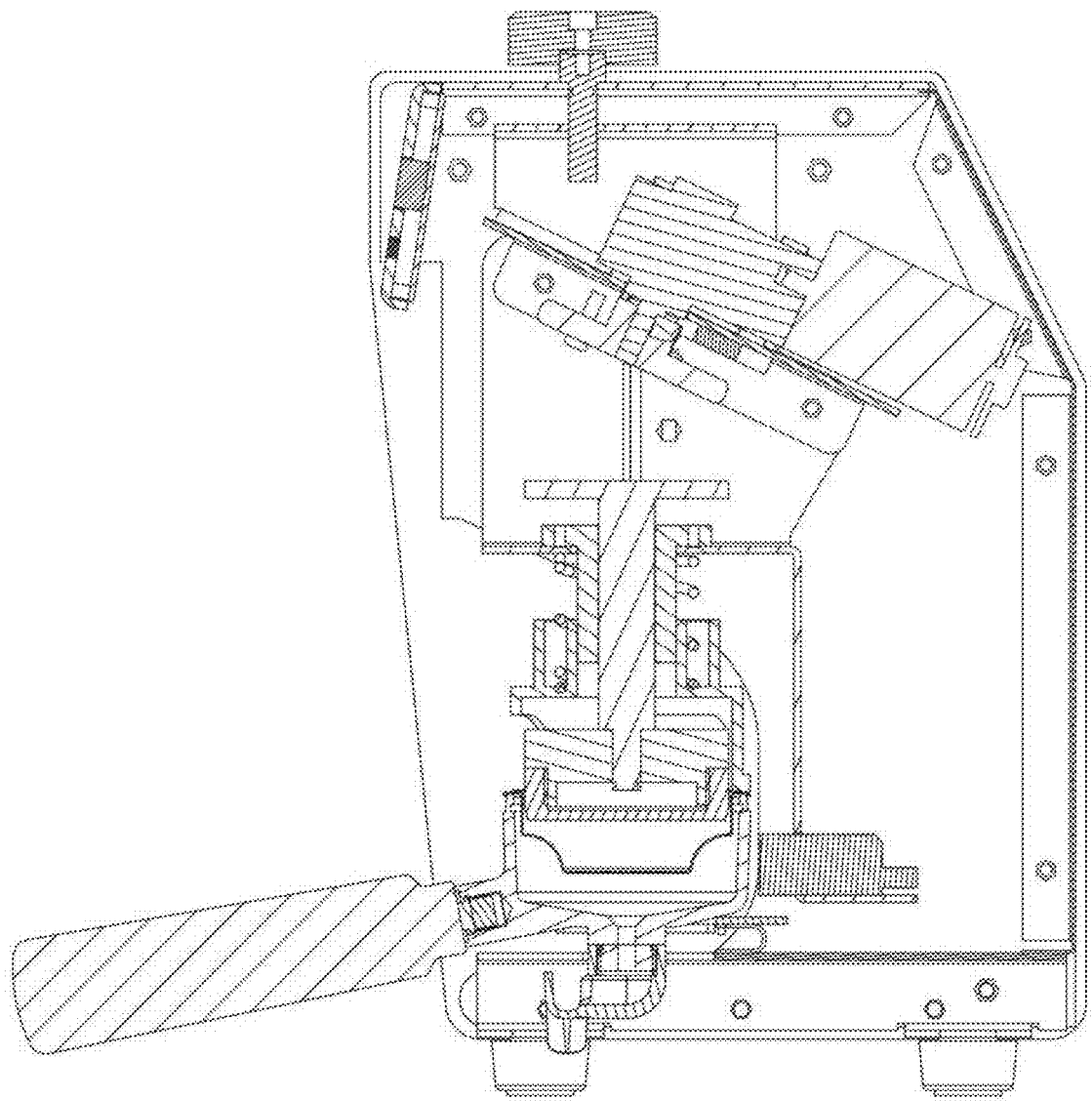
FIG. 8 is a lateral perspective structural schematic view after a container is put into the coffee tamper provided by the present invention and a tamping head is pressed down.
Figure 9:
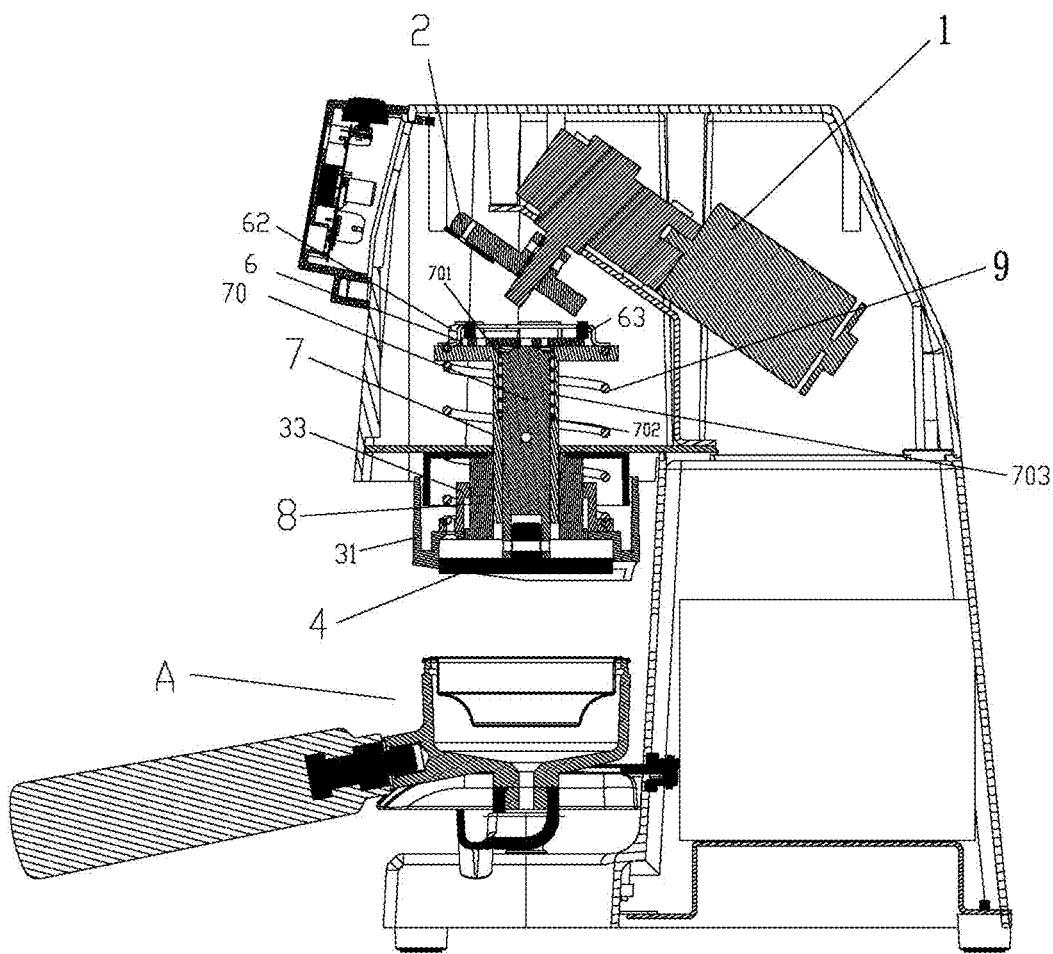
FIG. 9 is a lateral perspective structural schematic view of a coffee tamper in an alternative embodiment of the present invention (the transmission component is not shown).
Figure 10:
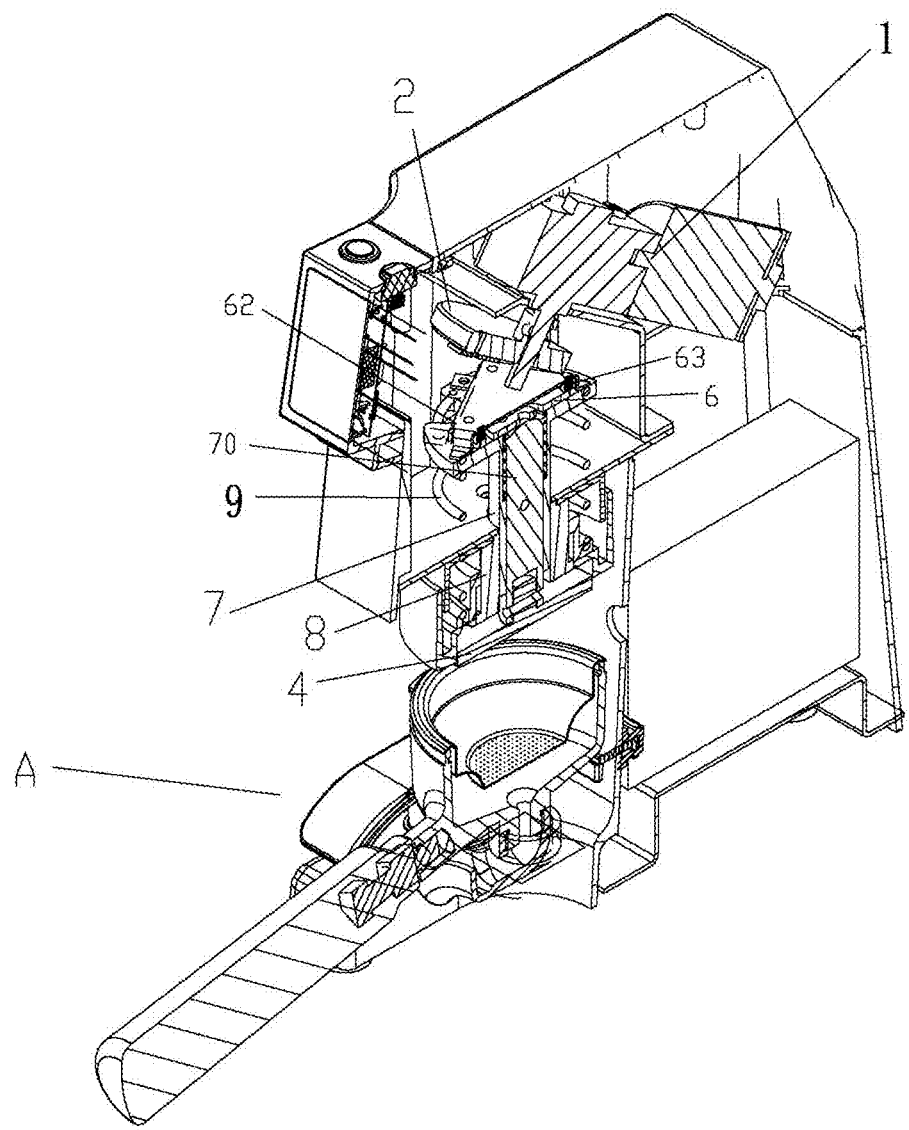
FIG. 10 is a structural schematic view of FIG. 9 at an alternative angle.
Figure 11:
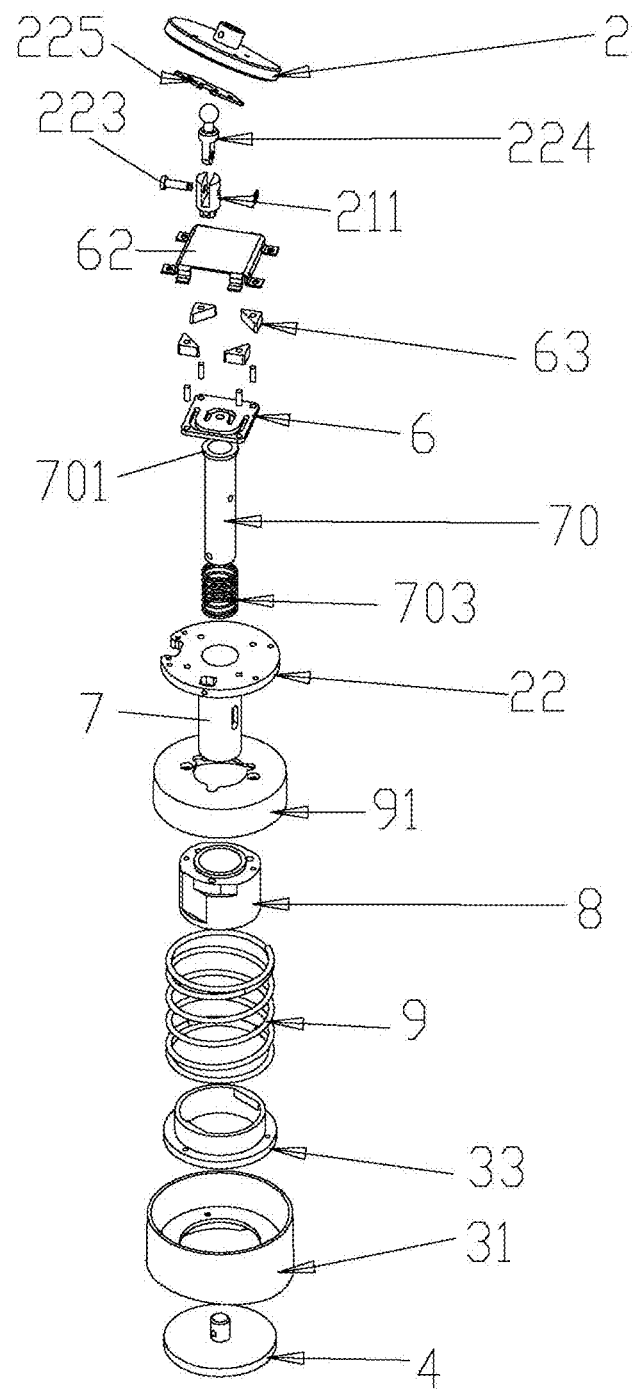
FIG. 11 is an exploded view of the coffee tamper in the embodiment shown in FIG. 9.
Figure 12:
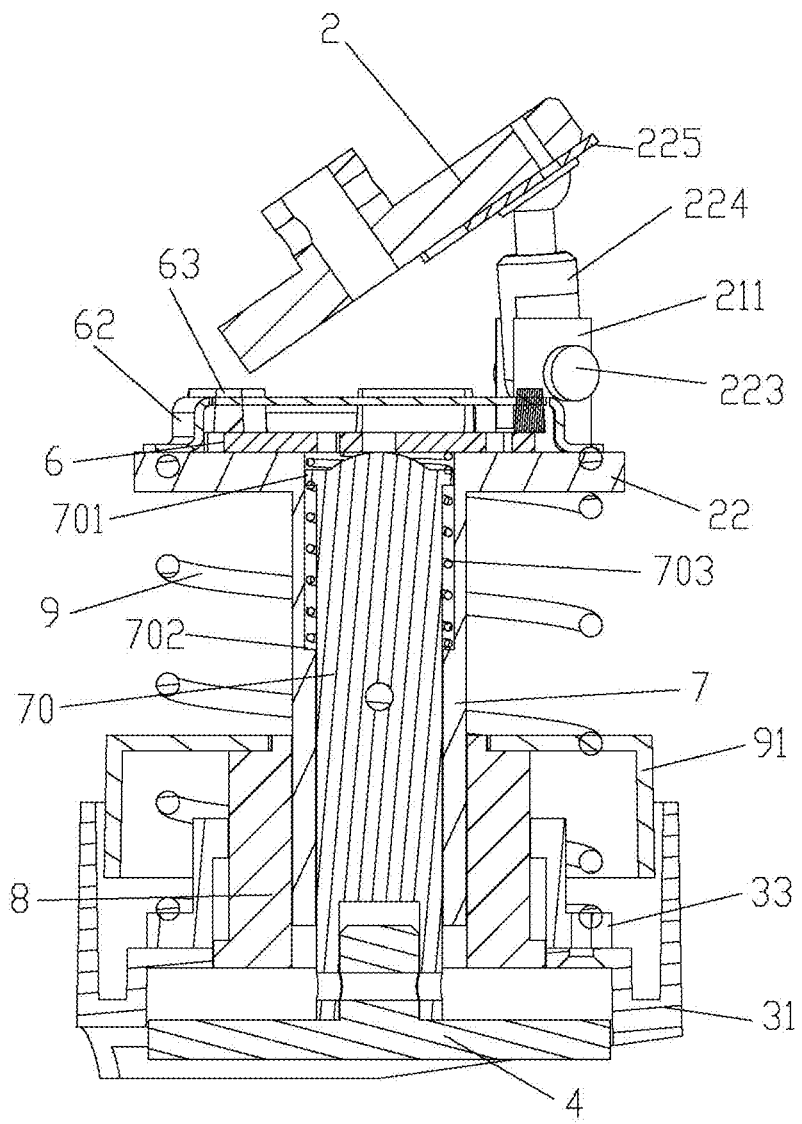
FIG. 12 is an enlarged lateral perspective structural schematic view of the upper half of the coffee tamper in the embodiment shown in FIG. 9.
Figure 13:
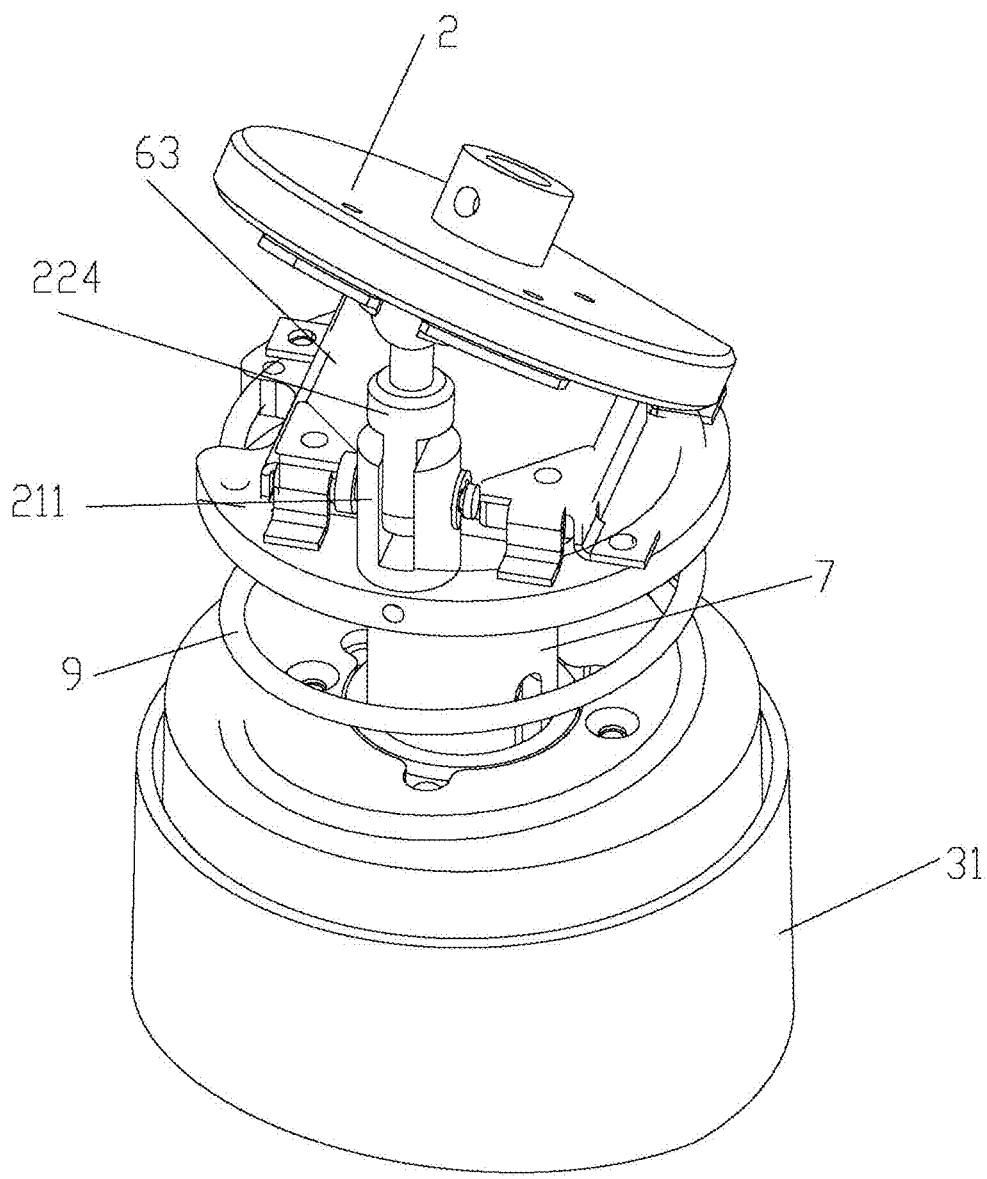
FIG. 13 is a three-dimensional structural schematic view of FIG. 9.

As shown in FIGS. 1-8, the present invention discloses a coffee tamper. The coffee tamper comprises a casing. A driving device is arranged on the inner top of the casing, connected to a tamping device and used to drive the tamping device to press down and move up. The tamping device is used to press down a container filled with coffee powder. As an emphasis, the tamping device comprises a main shaft 7, the driving device is connected to the upper end of the main shaft 7, and a tamping head 4 is connected to the lower end of the main shaft 7. The bottom of the tamping head 4 is a planar structure, and may also be set in other shapes subject to needs, such as a cambered surface, a concave surface, a bump texture or other structures, to achieve different tamping effects. As shown in FIG. 8, the tamping head 4 can be pressed into a container A. The tamping head and the main shaft may adopt a detachable connecting structure to facilitate replacement of a matched tamping head according to the size and depth of the container (portafilter) and also facilitate cleaning. In one of embodiments, the tamping head 4 is connected to the main shaft 7 in the form of a screw structure so that the distance between the tamping head (4) and the container A can be adjusted by rotating the tamping head 4.

A container pressing head 3 is sleeved on outside of the tamping head 4 and has an outer cover 31 sleeved on outside of the tamping head. The lower edge of the outer cover 31 is a horizontal structure and may press against the upper edge of the container A, thereby keeping the container A horizontal. The tamping head 4 can move up and down relative to the container pressing head 3. Three downward U-shaped openings are arranged on a side wall of the outer cover 31 of the container pressing head 3 to allow passage of containers filled with coffee powder and form three contact portions 32 on the same horizontal plane on the lower edge of the outer cover 31. When the container pressing head presses on the container, these three contact portions can maintain the containers horizontal and play a role in preventing titling, as shown in FIG. 7 and FIG. 8. Further, before tamping, the coffee powder on the container generally forms a small hill. The U-shaped opening can facilitate passage of the container filled with coffee powder, and the barista does not need to flatten the small hill, thereby reducing a step.

A metal detecting component 5 is arranged at the bottom of the casing located below a tamping head 4 and used to detect whether the container is properly placed. The detection can be achieved through a wireless metal detecting component, or a button or other forms of physical contacts to prevent the tamping head 4 from being pressed down by mistake, causing an accident.

An electronic scale 6 that can measure pressure may be arranged at the bottom of the casing, too, and when a container A is put into the coffee tamper, the container is put on the electronic scale 6. As shown in FIG. 6, the electronic scale (6) may be provided with an outward U-shaped opening 61, which is matched with a container, allows entry of the container and supports the container. The electronic scale may measure the down force of the tamping head upon coffee powder in real time. When the measured pressure is equal to the target pressure, the motor may stop an action of pressing down.

A main role of the driving device is to press down the tamping head, optimally, rotate while pressing down to complete an action of flattening the coffee powder in addition to tamping. The driving device may use a simple screw to drive the tamping head. This structure can be implemented by those of ordinary skill in the art, so no unnecessary details will be given here.

Figure 1:
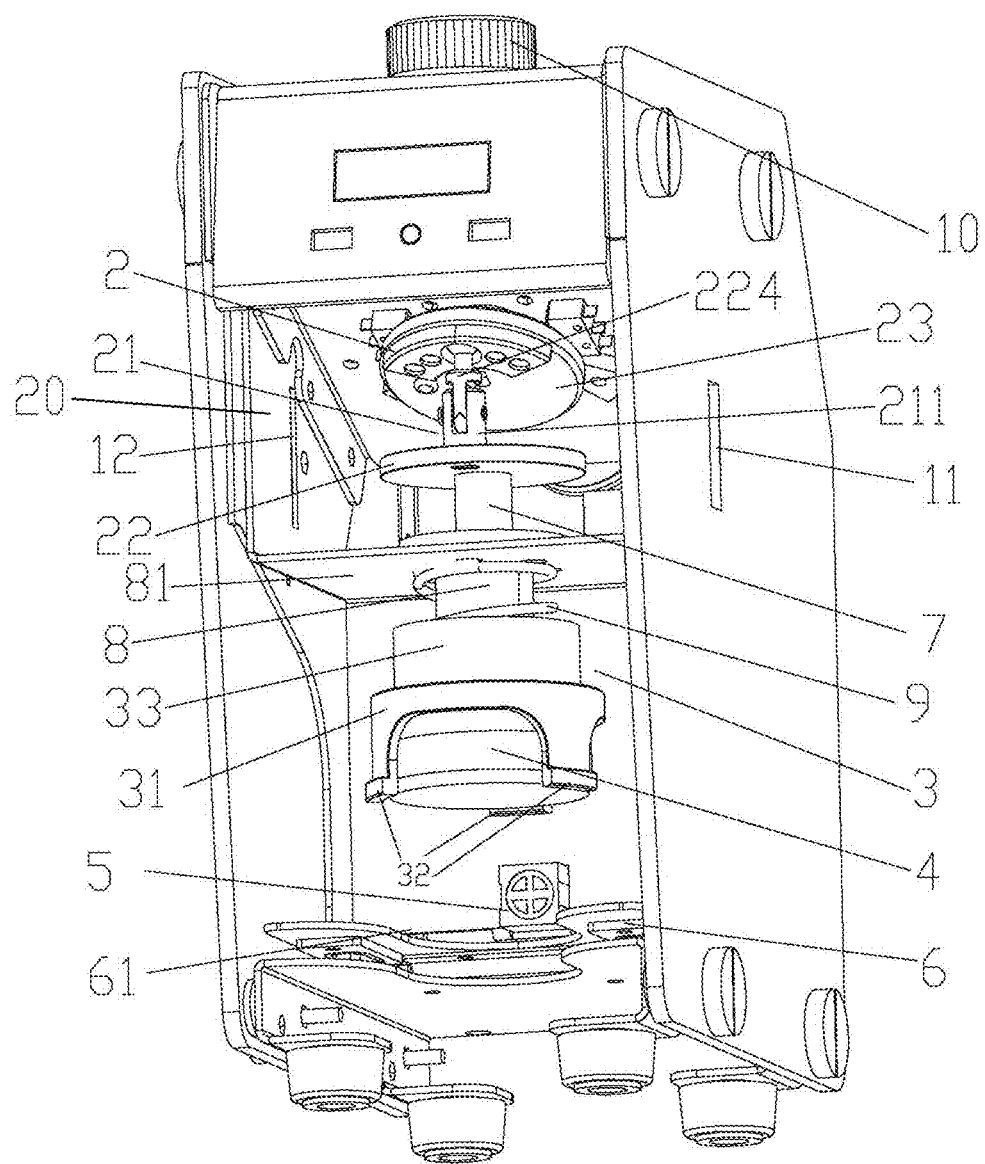
FIG. 1 is a three-dimensional structural schematic view of a coffee tamper provided by the present invention.
Figure 2:
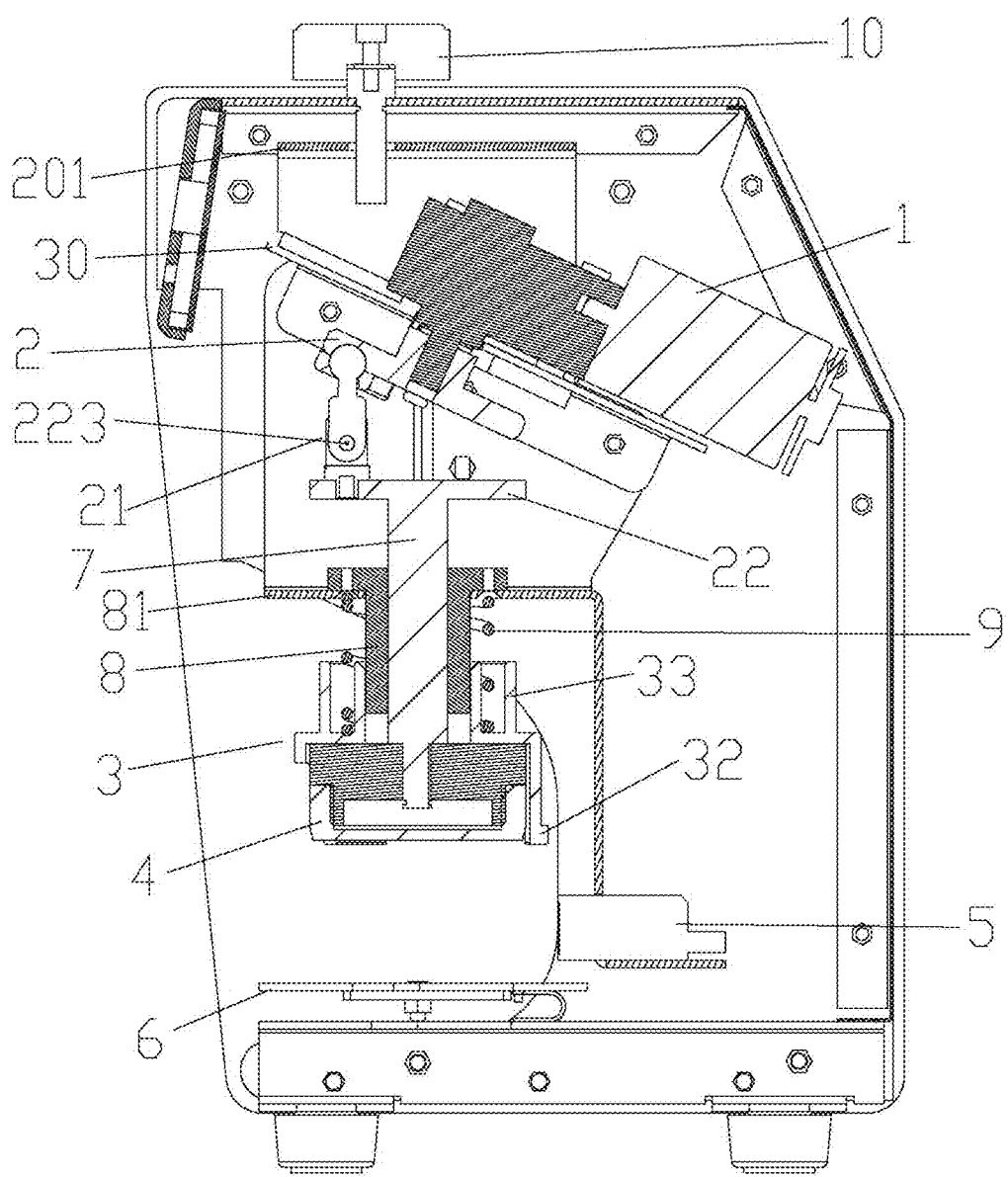
FIG. 2 is a lateral perspective structural schematic view of a coffee tamper provided by the present invention.
Figure 3:
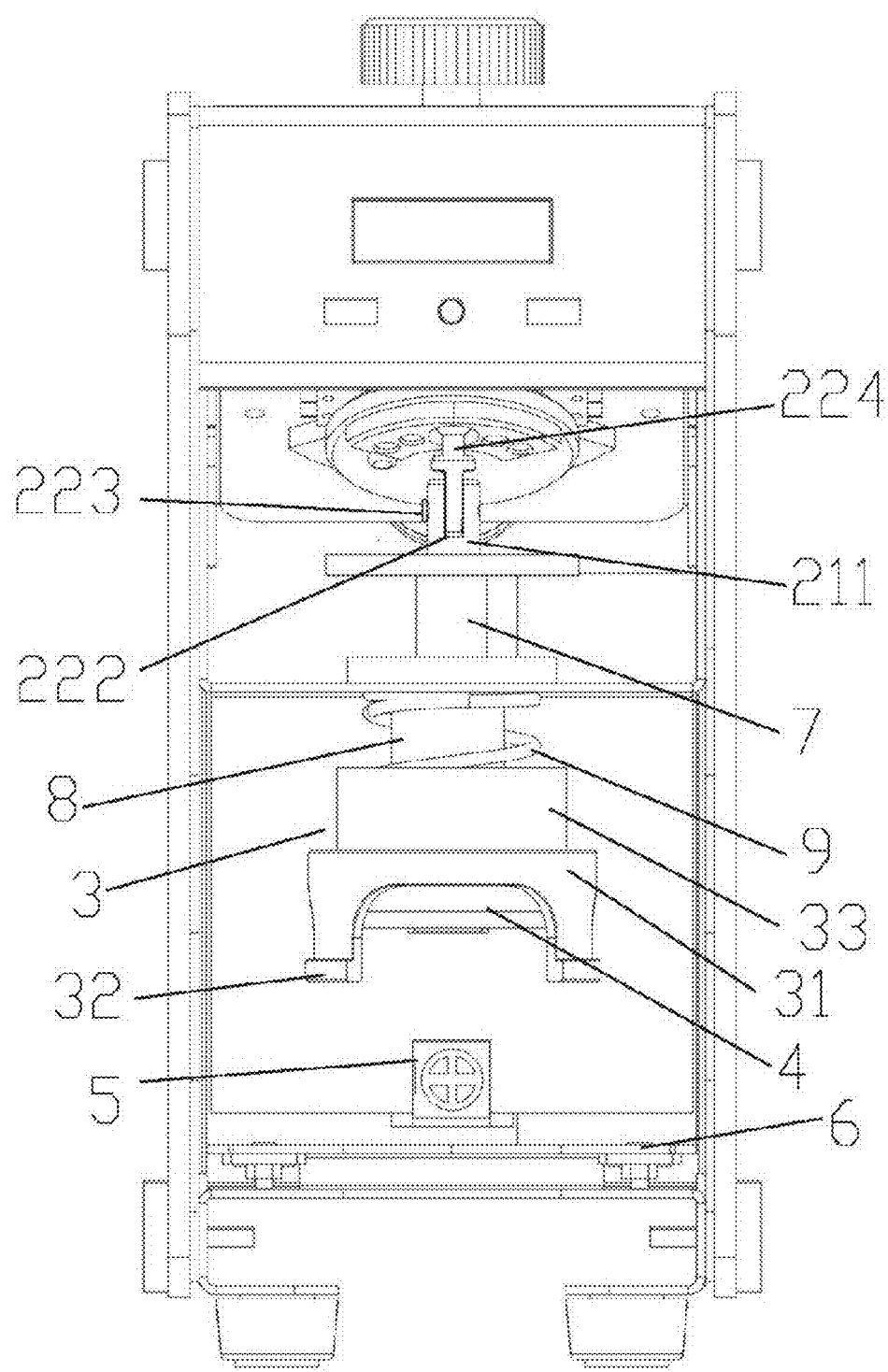
FIG. 3 is a front structural schematic view of a coffee tamper provided by the present invention.
Figure 4:
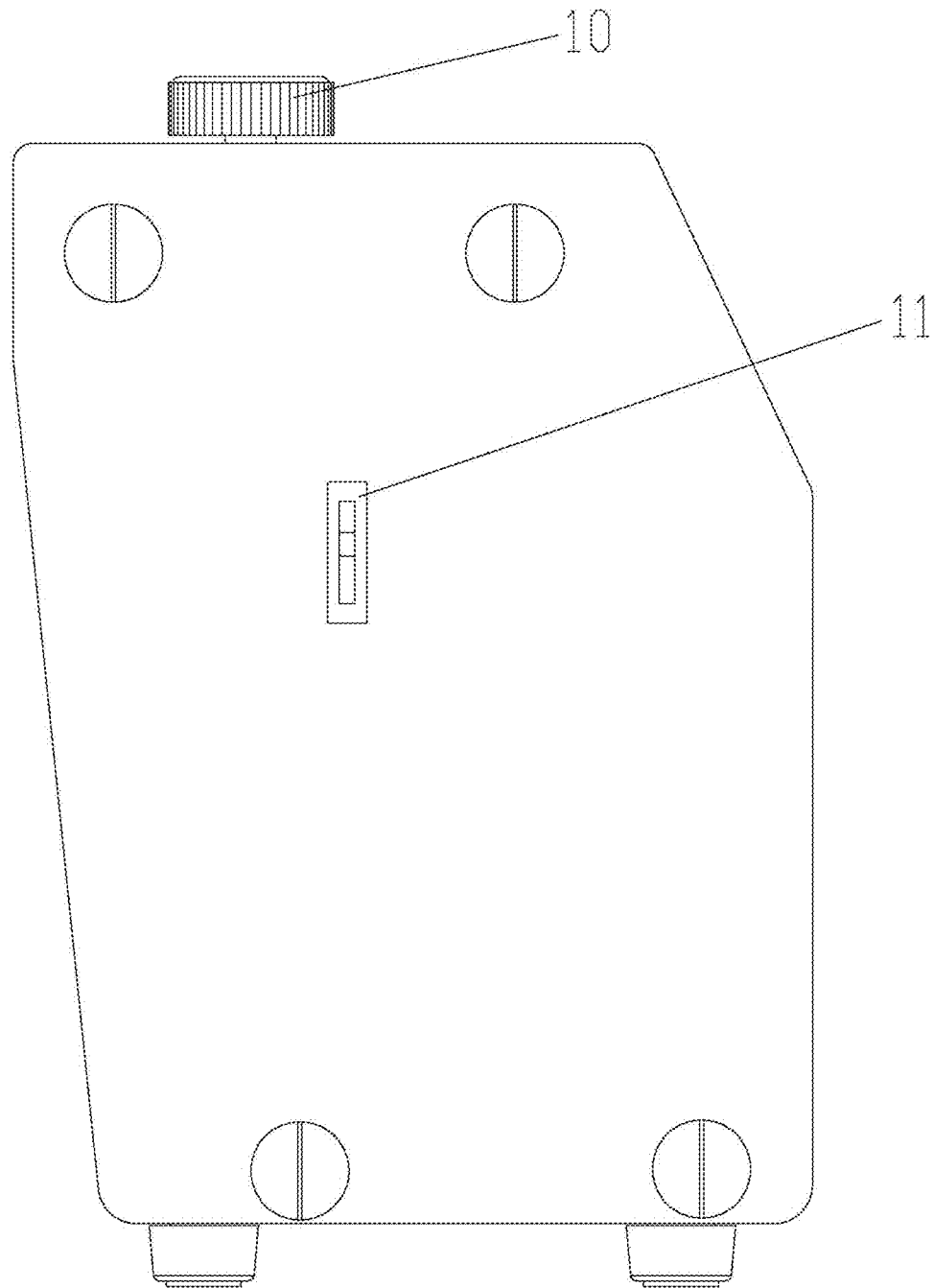
FIG. 4 is a lateral structural schematic view of a coffee tamper provided by the present invention.
Figure 5:
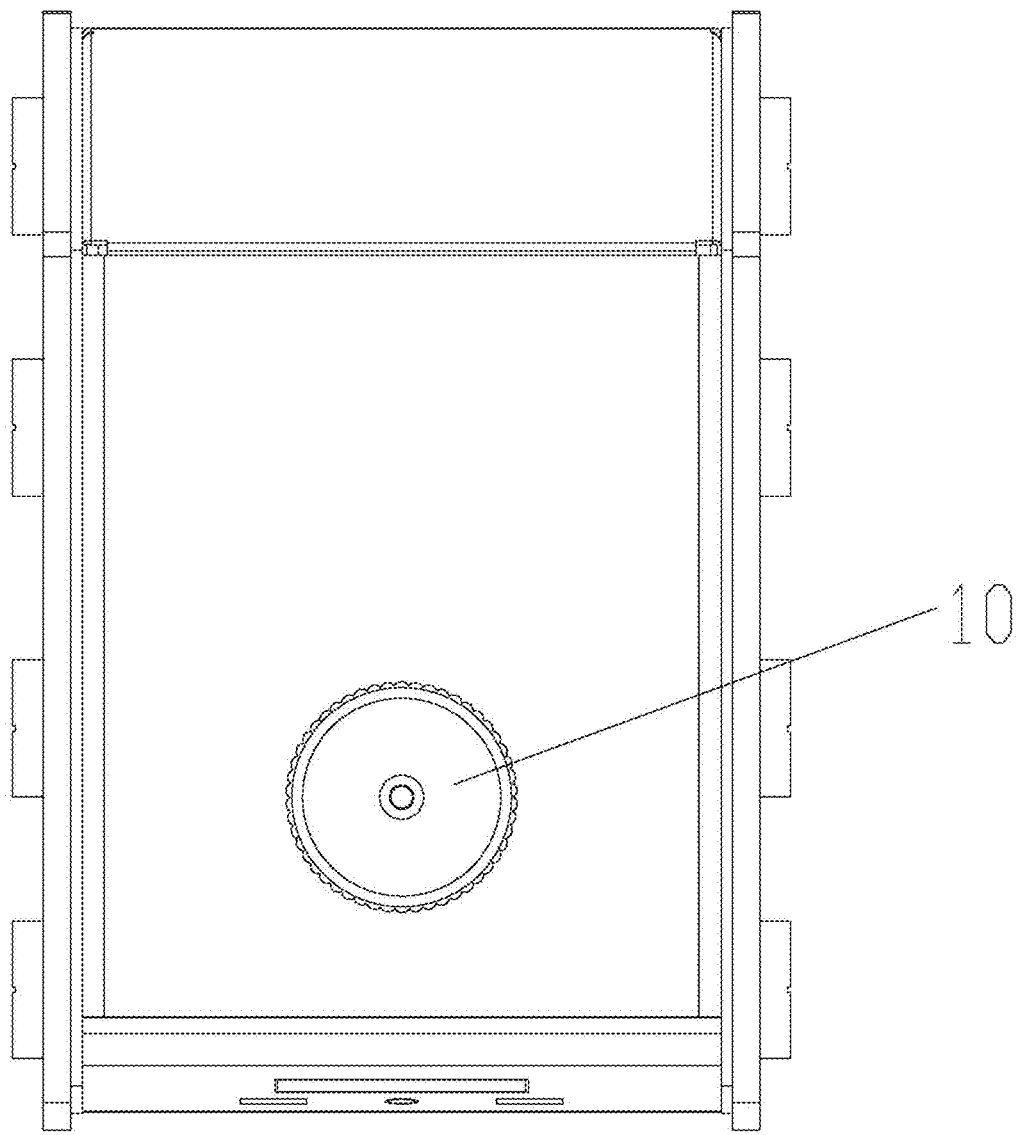
FIG. 5 is a top structural schematic view of a coffee tamper provided by the present invention.

The embodiment of the present invention provides a novel structure. In this embodiment, the driving device comprises an obliquely arranged tilting disc 2, and the center of the tilting disc 2 is connected to a motor 1 that drives the tilting disc to rotate. Generally, the maximum rotation angle of this disc is controlled at 180°. As shown in FIG. 1, an outer cover 23 can be arranged outside the tilting disc, an opening is arranged at the front end of the outer cover, the outer cover is used to limit the rotation angle of the tilting disc, and the limited angle is decided according to the size of the opening.

The lower surface of the high end of the tilting disc 2 is connected to a transmission component 21, the bottom of the transmission component 21 is connected to a location near an outer side of the upper surface of a horizontal disc 22, and the center of the lower surface of the horizontal disc 22 is connected to a main shaft 7. The bottom of the transmission component 21 is a fixing seat 211, an opening 222 is arranged in the middle of the fixing seat 211, interior of the opening 222 is connected to the lower end of a rotating arm 224 via a connecting shaft 223, and the upper end of the rotating arm 224 is a spherical joint contained in the tilting disc 2 to form a movable connecting structure. In this structure, when the tilting disc rotates, the tilting disc drives the main shaft to move downwards and rotate at the same time to realize simultaneous press-down and rotation of the tamping head.

In this embodiment, a fixing shaft 8 is further provided, the upper end of the fixing shaft 8 is fixed with a locating plate 81 arranged at a middle location inside the casing, the fixing shaft 81 is sleeved on a main shaft 7, the top of an outer cover 31 of the container pressing head 3 is connected to a fixing portion 33, through which the container pressing head 3 is connected to the fixing shaft 8 in a sleeved manner, a spring 9 is contained in the fixing portion 33 and sleeved on the fixing shaft 8, one end of the spring 9 is connected to the locating plate 81 and the other end presses against the top of the outer cover 31 of the container pressing head 3. The sleeved spring can provide a pressure so that the container pressing head presses the container tightly.

A longitudinal fixing plate 20 can be arranged inside the casing, the bottom of the longitudinal fixing plate 20 is connected to a locating plate 81, a plate 201 is horizontally arranged on the top of the longitudinal fixing plate 20, and a height adjusting knob 10 is arranged at the top of the casing, passes through the top of the casing and is connected to the plate 201 in a threaded manner; by rotating this adjusting knob, the plate can move up and down, and further, the movement of the plate can drive other components connected to the plate to move up and down. These components can be a motor, a tilting disc, a container pressing head, a tamping head, a main shaft and a fixing shaft. Further, a locating slot 11 is arranged in the middle of a side wall of the casing. From the locating slot, an internal adjusting location can be seen, and alternatively, a plug pin, a screw or another component can be inserted to cooperate with internal components, and work with the height adjusting knob to realize locating and fixation. By adjusting overall height, the clearance between the container pressing head and the inserted container can be narrowed to reduce tilting of the container, and alternatively, containers in various sizes can be used in this automatic coffee tamper.

The tilting disc 2 and a motor 1 are arranged on an obliquely arranged moving plate 30, the lower end of the moving plate 30 is fixed on the longitudinal fixing plate 20 in a rotatable manner, an inclination adjusting slot 12 is vertically arranged on the longitudinal fixing plate 20, and a relative high end of the moving plate 30 is fixed with the inclination adjusting slot 12 in a movable manner so as to adjust inclination of the moving plate 20. The inclination of the moving plate can be adjusted by inserting a plug, or a screw into the inclination adjusting slot. This can be implemented by those of ordinary skill in the art, so no unnecessary details will be given here.

In the present invention, an electronic system, a circuit, a power supply, a display screen, operation buttons, etc. can be provided according to requirements, and these contents can be realized by those skilled in the art, and are not the focus of the present application, so no unnecessary details will be given here.

The basic operating procedure of the coffee tamper of the present invention is as follows.

The user first inputs a target pressure into the coffee tamper of the present invention. A container filled with coffee powder is put in. After the metal detecting component detects the container, the motor will be started to rotate the tilting disc so that the tamping head generates an action of pressing down (this function can be realized by a screw, too). The container pressing head provides three contacts to keep the container horizontal. The electronic scale can measure pressure in real time until the measured pressure is equal to the target pressure. By then, the motor will stop action to make the tamping head stop the action of pressing down at the same time.

Further, in addition to the target pressure, the user may also input times of downward presses into the coffee tamper of the present invention, and the electronic system of the tamper can set two groups of data including target pressure and times of downward presses. In the process of tamping several times, when the target pressure is reached, the motor can drive the tilting disc to rotate in a reverse direction, prompting the tamping head to slightly withdraw upwards. The electronic scale measures pressure in real time. When the measured value of the electronic scale is reduced, the tilting disc can be driven to rotate again to press towards coffee powder until the value of the electronic scale reaches the target pressure. Thus it can be seen, the coffee tamper of the present invention can rotate and tamp coffee powder several times in a short time to ensure the pressure on coffee powder is more uniform and does not exceed the target pressure. Of course, re-pressing towards coffee powder after reset of the electronic scale can be set. This mode of multiple pressing is more similar to the mode of pressing by human hands.

In the foregoing embodiment, as the electronic scale is arranged at the bottom, the electronic scale measures the pressure on the bottom of the container (also known as portafilter) in fact, whereas containers are in different sizes and depths, the height between the tamping head and the electronic scale may not be matched with all containers, and the electronic scale is a highly sensitive component and frequent adjustment of its height will affect its accuracy. On the other hand, the electronic scale is an important component of the coffee tamper, and is liable to damage or contamination if it is arranged at the bottom in an exposed manner.

Therefore, as shown in FIG. 9-FIG. 13, the present invention provides an alternative embodiment. The key is to conceal the electronic scale 6 above the main shaft 7 of the tamping head 3. In other words, the upper end of the main shaft 7 is connected to the electronic scale 6. In this embodiment, the electronic scale 6 is a precision load cell. This structure can achieve a better feedback effect during tamping. Through this design, force from coffee powder is directly transferred to the electronic scale via the tamping head and the main shaft, force measurement is more accurate, and contamination is avoided In this embodiment, the main shaft 7 is a hollow structure, a weighing shaft 70 is sleeved inside the main shaft 7, a clamping edge 701 is outwardly arranged at the upper end of the weighing shaft 70, an accommodation space is arranged between the upper inner wall of the main shaft 7 and the weighing shaft 70, a step portion 702 is formed below the accommodation space, a shaft spring 703 is arranged inside the accommodation space, the upper end of the shaft spring 703 is against the lower part of the clamping edge 701, and the lower end of the shaft spring 703 is against the step portion 702; the upper end face of the clamping edge 701 presses against the lower surface of the electronic scale 6, and the lower end of the weighing shaft 70 is connected to a tamping head 4.

Further, this embodiment further provides a related structure of an alternative tamping head 4. As shown in the figure, the upper end of the tamping head 4 is connected to the lower end of the main shaft 7 in a plug-in manner. As a major difference from other embodiments, the outer cover 31 of the container pressing head 3 on the outer side of the tamping head 4 in this embodiment is an integral annular structure. Similarly, the outer cover 31 is combined with a fixing portion 33 to form a tamping head 3.

Further, conventionally, in order to protect the electronic scale and achieve more accurate measurement, a protective cover 62 can be arranged above the electronic scale 6, and rubber dampers 63 are arranged between the protective cover 62 and the electronic scale 6. The rubber dampers 63 can be as shown in the accompanying drawings of this embodiment, 4 in total, arranged at the four corners of the electronic scale 6. Other shapes or manners can be adopted, too. The electronic scale 6 can be arranged on a horizontal disc 22 connected to the main shaft 7.

Here, a specific structure for internal arrangement of a weighing device is provided. The key of this embodiment is internal arrangement of a weighing structure, while other structures are similar to those of the previous embodiment. This embodiment may be further provided with a spring shield 91, a driver blade 225, various screws and other related devices. Those of ordinary skill in the art may also adopt other implementable similar structures.

What is claimed is:

1. A coffee tamper, comprising a casing, wherein a driving device is arranged on an inner top of the casing, connected to a tamping device and used to drive the tamping device to press down and move up, the tamping device is used to press down a container filled with coffee powder and comprises a main shaft, the driving device is connected to an upper end of the main shaft, and a tamping head is connected to a lower end of the main shaft and can be pressed into the container,
   wherein the driving device comprises an obliquely arranged tilting disc, a center of the tilting disc is connected to a motor that drives the tilting disc to rotate;
   a lower surface of a high end of the tilting disc is connected to a transmission component, a bottom of the transmission component is connected to a location near an outer side of an upper surface of a horizontal disc, and a center of a lower surface of the horizontal disc is connected to the main shaft; and
   the bottom of the transmission component is a fixing seat, an opening is arranged in a middle of the fixing seat, interior of the opening is connected to a lower end of a rotating arm via a connecting shaft, and an upper end of the rotating arm is a spherical joint contained in the tilting disc to form a movable connecting structure.

2. The coffee tamper according to claim 1, wherein a container pressing head is sleeved on outside of the tamping head and has an outer cover sleeved on outside of the tamping head, a lower edge of the outer cover is located on a same horizontal plane and presses against an upper edge of the container, and the tamping head can move up and down relative to the container pressing head.

3. The coffee tamper according to claim 2, wherein at least one downward U-shaped opening is arranged on a side wall of the outer cover of the container pressing head to allow passage of the container filled with coffee powder.

4. The coffee tamper according to claim 2, wherein a fixing shaft is further provided, an upper end of the fixing shaft is fixed with a locating plate arranged at a middle location inside the casing, the fixing shaft is sleeved on the main shaft, a top of the outer cover of the container pressing head is connected to a fixing portion, through which the container pressing head is sleeved on the fixing shaft, a spring is contained in the fixing portion and sleeved on the fixing shaft, one end of the spring is connected to the locating plate and the other end presses against the top of the outer cover of the container pressing head.

5. The coffee tamper according to claim 4, wherein a longitudinal fixing plate is arranged inside the casing, a bottom of the longitudinal fixing plate is connected to the locating plate, a plate is horizontally arranged on a top of the longitudinal fixing plate, and a height adjusting knob is arranged at a top of the casing, passes through the top of the casing and is connected to the plate in a threaded manner; and
   the tilting disc and a motor are arranged on an obliquely arranged moving plate, a lower end of the moving plate is fixed on the longitudinal fixing plate in a rotatable manner, an inclination adjusting slot is vertically arranged on the longitudinal fixing plate, and a relative high end of the moving plate is fixed with the inclination adjusting slot in a movable manner so as to adjust inclination of the moving plate.

6. The coffee tamper according to claim 1, wherein the tamping head is connected to the main shaft in a form of a screw structure so that a distance between the tamping head and the container can be adjusted.

7. The coffee tamper according to claim 1, wherein a metal detecting component is arranged at a bottom of the casing located below the tamping head.

8. The coffee tamper according to claim 1, wherein an electronic scale that can measure pressure is arranged at a bottom of the casing, and when the container is put into the coffee tamper, the container is put on the electronic scale.

9. The coffee tamper according to claim 8, wherein the electronic scale is provided with an outward U-shaped opening, which is matched with the container, allows entry of the container and supports the container.

10. The coffee tamper according to claim 1, wherein the upper end of the main shaft is connected to an electronic scale.

11. The coffee tamper according to claim 9, wherein the main shaft is a hollow structure, a weighing shaft is sleeved inside the main shaft, a clamping edge is outwardly arranged at an upper end of the weighing shaft, an accommodation space is arranged between an upper inner wall of the main shaft and the weighing shaft, a step portion is formed below the accommodation space, a shaft spring is arranged inside the accommodation space, an upper end of the shaft spring is against a lower part of the clamping edge, and a lower end of the shaft spring is against the step portion;

an upper end face of the clamping edge presses against a lower surface of the electronic scale, and a lower end of the weighing shaft is connected to the tamping head.

12. The coffee tamper according to claim 10, wherein a protective cover is arranged above the electronic scale, and rubber dampers are arranged between the protective cover and the electronic scale.

* * * * *